Nov. 17, 1942.                H. J. HICKEY                2,302,442
                        INTERNAL COMBUSTION ENGINE
                          Filed July 12, 1940            3 Sheets-Sheet 3

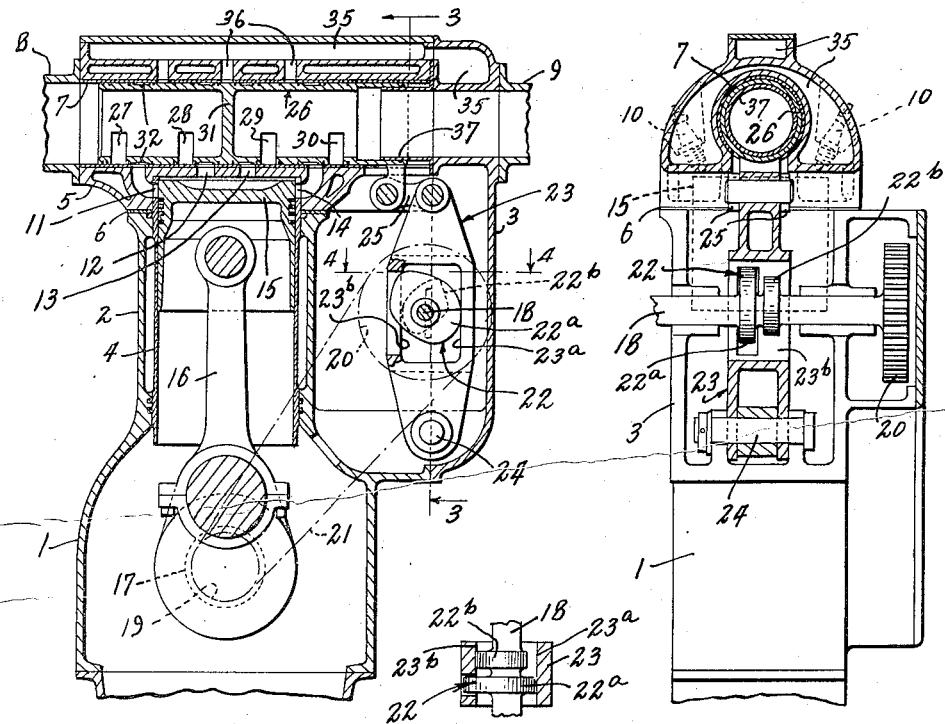
Fig. 1.
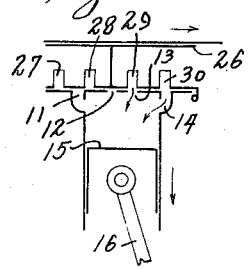
Fig. 4.
Fig. 3.
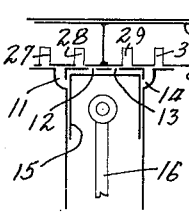 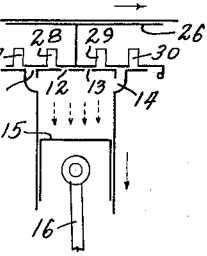 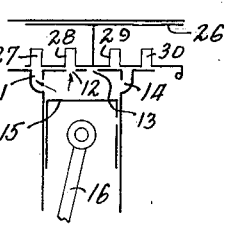
Fig. 5. Fig. 6. Fig. 7. Fig. 8.
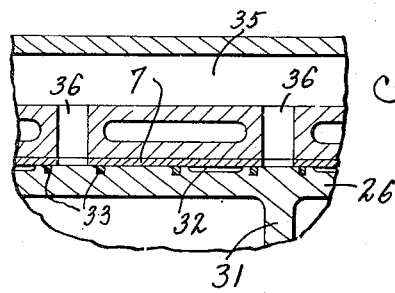
Fig. 2.
Inventor
Henri J. Hickey
By Lyon & Lyon
Attorneys

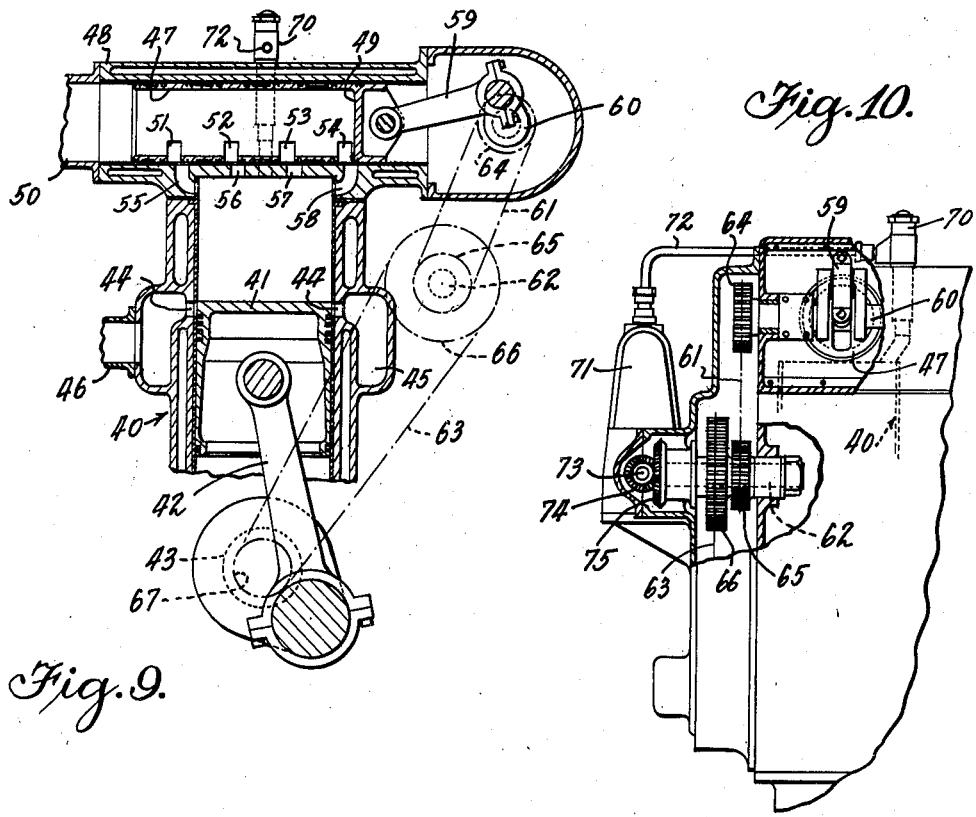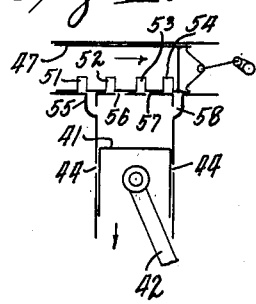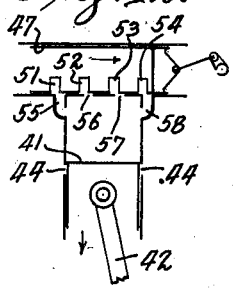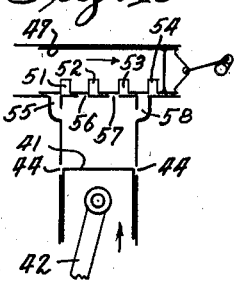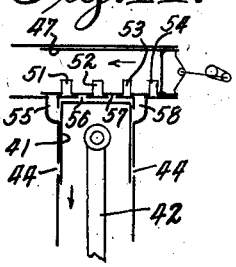

INVENTOR
BY Henri J. Hickey
Lyon & Lyon
ATTORNEYS

Patented Nov. 17, 1942

2,302,442

UNITED STATES PATENT OFFICE 2,302,442

INTERNAL COMBUSTION ENGINE

Henri J. Hickey, Beverly Hills, Calif.

Application July 12, 1940, Serial No. 345,027

4 Claims. (Cl. 123—188)

This invention relates to internal combustion engines, and more particularly to details of the valve mechanism for introducing and exhausting gases to and from the combustion chamber. It is applicable to engines of the fuel injection type, as well as to engines of the carbureting type, and to both 2-cycle and 4-cycle engines.

An object of the invention is to provide a simple and highly efficient engine, having few parts and being reliable and economical in service.

Another object is to provide relatively large passages for the flow of gases into and out of the combustion chamber, without the necessity of employing valve parts operating at excessive speeds.

Another object is to provide an exhaust valve construction suitable for use in a 2-cycle engine and capable of operating at relatively low temperatures.

Another object is to provide a particularly simple and effective valve structure for internal combustion engines, which also provides for the secondary burning of the charge after the working piston has begun its working stroke.

Other more specific objects and features of the invention will be apparent from the following detailed description of certain preferred embodiments of the invention, as disclosed in the drawings.

In the drawings:

Fig. 1 is a vertical cross-section through a 4-cycle engine, in accordance with the invention, with certain portions broken away;

Fig. 2 is an enlarged detail section through a portion of the valve cylinder and piston walls;

Fig. 3 is a section taken at right angles to the section of Fig. 1, substantially in the plane III—III of Fig. 1;

Fig. 4 is a detail cross-section, taken substantially in the plane IV—IV of Fig. 1;

Figs. 5, 6, 7 and 8 are schematic diagrams illustrating the operation of the engine of Fig. 1;

Fig. 9 is a sectional view, similar to Fig. 1, but showing a 2-cycle engine in accordance with the invention;

Fig. 10 is a view taken at right angles to the section of Fig. 9, the view being taken in elevation with certain portions broken away to show the internal construction;

Figs. 11, 12, 13 and 14 are schematic diagrams illustrating the operation of the engine of Fig. 9;

Figure 15:
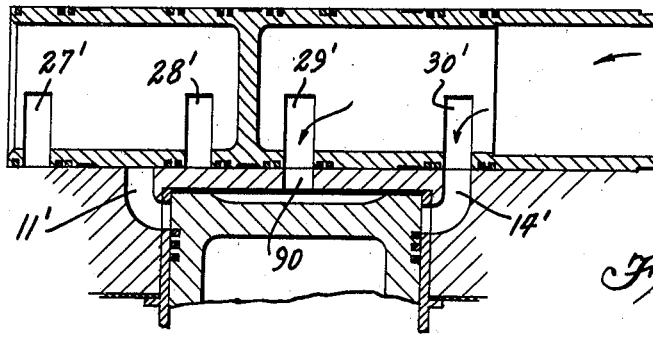
Figs. 15 and 16 are detail views, showing a variation of the valve structure of Fig. 1, the view showing the valve in two extreme positions of operation.

Referring to Fig. 1, there is shown a crankcase 1 formed integrally with a cylinder water jacket 2 and a cam-case 3. Positioned within the water jacket 2 is a liner 4 defining the wall of the working cylinder. A cylinder head 5 is secured against the upper end of the water jacket, being in sealing engagement therewith by virtue of a gasket 6. The liner 4 extends a short distance up into the cylinder head 5. The cylinder head contains a cylindrical sleeve or liner 7 which defines a valve cylinder extending transversely across the upper end of the working cylinder. The left end of the valve liner 7 communicates with an exhaust manifold 8 and the right end of the liner communicates with an intake manifold 9. The intake manifold 9 may communicate with the usual carburetor, not shown. A pair of spark plugs 10 (Fig. 3) may be provided in the cylinder head for ignition, in the usual manner.

Two inlet and two exhaust ports are provided between the upper end of the working cylinder and the valve cylinder. Thus an exhaust port 11 communicates through the side of the working cylinder liner 4 and curves through a right angle bend into the valve cylinder 7. The other exhaust port is a short straight port 12 extending through the head of the working cylinder into the valve cylinder. A similar short straight inlet port 13 extends through the head of the working cylinder into the valve cylinder, and an inlet port 14 extends through the side of the working cylinder liner 4 and is curved through a right angle bend into the valve cylinder.

A working piston 15 is mounted in the working cylinder liner 4 for reciprocation therein by a connecting rod 16 from a crankshaft 17. The crankshaft 17 drives a camshaft 18 at half engine speed through sprockets 19 and 20 on the crankshaft and the camshaft, respectively, and a chain indicated schematically at 21. Mounted on the camshaft 18 is a two-piece cam 22 cooperating with a rocking cam follower 23, the lower end of which is pivotally supported for rocking motion on a shaft 24, and the upper end of which is connected by a link 25 to a valve piston 26. This valve piston 26 reciprocates within the valve liner 7 and has a pair of exhaust ports 27 and 28 cooperating with the exhaust ports 11 and 12, respectively, and has a pair of inlet ports 29 and 30 cooperating with the stationary inlet ports 13 and 14, respectively. The valve piston is provided with a partition wall 31 which separates the exhaust and inlet ends thereof.

The valve piston is preferably provided with annular recesses 32 which are juxtaposed to the inlet and exhaust ports in the valve cylinder during the compression and explosion phases of operation so that the pressures developed in the combustion chamber apply equally to all sides of the valve piston, and do not produce side thrust thereon. Compression rings 33 are provided on the valve piston to prevent leakage of gases from the recesses 32 to the various ports. The camshaft case 3 is in communication with the crankcase 1 and the camcase is in turn in communication through a passage 35 with ports 36 extending through the valve cylinder liner so that oil mist from the crankcase is carried to the valve cylinder and piston for the lubrication thereof.

An intake neck 37 extends into the right end of the valve piston 26 to prevent the incoming fuel mixture from washing lubricant off the wall of the valve cylinder.

The cam 22 includes a large lobe 22a and a small lobe 22b. The large lobe 22a constantly bears against one face 23a of the follower 23 and the small lobe 22b constantly bears against an opposite face 23b on the follower so that the motion of the follower is positively controlled at all times. The lobes 22a and 22b are so shaped as to move the valve piston rapidly to carry the ports therein into and out of registration with the stationary ports in the valve cylinder, but cause the valve piston to move relatively slowly during "registration" and "out of registration" periods to provide large passages to the combustion chamber, conducive to rapid and complete charging and exhausting of the combustion chamber.

As shown in Fig. 1, the working piston 15 is in upper dead-center position at the end of the compression and the beginning of the working stroke. At this time a charge is highly compressed within the ports 11, 12, 13 and 14 and in the upper end of the working cylinder. The ports 12 and 13 are in direct communication with the combustion chamber in the cylinder at this time, but the ports 11 and 14 are cut off from the explosion chamber since they are covered by the working piston 15. The charge in the combustion chamber and the ports 12 and 13 is exploded by the spark plugs 10 and immediately develops pressure against the working end of the piston. Shortly after the working piston begins its downward movement it uncovers the ports 11 and 14 and the charge previously compressed in those ports is then ignited to produce a second power impulse at a time when the connecting rod 16 is at such an angle that the force developed on the piston can be effectively transmitted to the crankshaft 17.

The operation of the piston valve is clearly disclosed in the schematic diagrams of Figs. 5, 6, 7 and 8. In Fig. 5 the working piston is shown moving downward on the intake stroke, at which time the valve piston ports 29 and 30 are in registration with the stationary ports 13 and 14 and a charge is being drawn into the working cylinder through those ports from the intake manifold. At the time in the cycle represented by Fig. 5 the valve piston is substantially in extreme left position and thereafter begins moving slowly to the right so that when the working piston 15 reaches the lowermost position and reverses, the valve piston 26 has moved far enough to the right to close the intake ports but has not moved far enough to the right to open the exhaust ports. During the portion of the cycle from the beginning of the compression stroke to near the end of the working stroke, the valve piston 26 remains substantially stationary by virtue of the shapes of the cam lobes 22a and 22b.

Fig. 6 shows the position of the valve piston 26 in which both the intake and exhaust ports are closed at the end of the compression stroke and the beginning of the working stroke.

In Fig. 7 the working piston is approaching the lower end of the working stroke, and the valve piston 26 (moving to the right at accelerating speed) will soon begin to register the exhaust ports 27 and 28 of the valve piston with the stationary exhaust ports 11 and 12, respectively. Thereafter the valve piston moves rapidly into the position of full opening of the exhaust ports, and the exhaust ports are in fully open position near the next midstroke of the working piston, as shown in Fig. 8. Thereafter the valve piston reverses its direction and accelerates rapidly to the left, so that it first closes the exhaust ports near the end of the exhaust stroke and thereafter promptly opens the intake ports, the latter being fully open when the working piston is substantially in midstroke position, and the valve piston 26 is in extreme left position, as shown in Fig. 5.

The device described has the great advantages of any cylinder type valve over the conventional poppet valve, and has the additional advantage of employing only a single movable valve piston for each working cylinder. As clearly shown in Figs. 1 and 3, the valve cylinder and piston for each working cylinder is mounted crosswise immediately above the working cylinder so that any number of cylinders desired can be mounted in line above the crankshaft 17 and all of the valve pistons can be readily actuated from cams on the single camshaft 18.

Another advantage of the construction disclosed is that the partition 31 in the valve piston becomes highly heated from the exhaust gases and is in direct line with the direction of flow of the incoming gases so that any unvaporized particles of fuel therein will tend to impinge upon the hot partition 31 and be completely vaporized.

Referring now to Fig. 9, the 2-cycle engine therein disclosed comprises a working cylinder 40 containing a working piston 41 connected by a connecting rod 42 to a crankshaft 43.

The cylinder wall contains inlet ports 44 which are covered by the working piston except when it is at the extreme lower end of its stroke. These ports 44 communicate with an intake manifold 45 which in turn may communicate with an intake supply line 46. The engine disclosed happens to be of the Diesel type in which air under pressure would be supplied through the pipe 46 into the manifold 45.

Exhaust is effected by a valve piston 47 mounted in a valve cylinder 48 extending across the working cylinder head, as in the model previously described. However, since the intake is effected through the ports 44, and the piston 47 provides only for the exhaust, the construction of the valve piston is simplified. Thus the valve piston does not have a central partition, as did the model of Fig. 1, but instead has an end closure wall 49, the other end (left end), being open and communicating with an exhaust manifold 50. The valve piston has four ports 51, 52, 53 and 54 adapted to communicate with ports 55, 56, 57 and 58, respectively, in the cylinder head. By virtue of the large number of exhaust ports employed, the valve piston 47 can move with a simple harmonic motion at half engine speed and still provide adequately dimensioned gas passages. The passages 55 and 58, like the passages 11 and 14 of Fig. 1, extend into the side walls of the working cylinder so that they are covered and uncovered by the working piston to provide a secondary power impulse or explosion after the working piston starts on its working stroke.

The valve piston 47 may be reciprocated by any desired mechanism but in the particular construction shown in Figs. 9 and 10, the piston 47 is connected by a connecting rod 59 to a crankshaft 60. The crankshaft 60 carries a sprocket 64 coupled by a chain 61 to a sprocket 65 on a countershaft 62. The sprockets 64 and 65 are of the same diameter so that the crankshaft 60 and the countershaft 62 rotate at the same speed. The countershaft 62 carries another sprocket 66 which is coupled by a chain 63 to a sprocket 67 on the main crankshaft 43. The sprocket 67 is half the size of the sprocket 66 so that the countershaft 62 is driven at half the speed of the main crankshaft 43.

As previously indicated, the engine shown in Figs. 9 and 10 is of the Diesel type. It is therefore provided with a fuel injector 70 through which fuel is injected at the beginning of each working stroke by a fuel pump 71, the latter delivering fuel under high pressure to the injector 70 through a tubing line 72. Injectors and fuel pumps for Diesel engines are well-known and need not be described in detail herein. However it is ordinarily necessary with conventional fuel pumps for 2-cycle Diesel engines, that the fuel-pumpshaft be driven at crankshaft speed. Therefore, in Fig. 10 the actuating shaft 73 of the fuel pump 71 is shown coupled to the countershaft 62 by beveled gears 74 and 75, the gear 74 being half the size of the gear 75 so that the fuel pumpshaft 73 is driven at twice the speed of the countershaft 62, which is the speed of the main crankshaft 43.

The operation of the engine shown in Figs. 9 and 10 is illustrated in part by the schematic views of Figs. 11, 12, 13 and 14. In Fig. 11 the working piston 41 is about two-thirds of the way down on the working or explosion stroke, at which time the exhaust valve piston 47 moving to the right is just beginning to open the exhaust ports. In Fig. 12 the working piston has moved down a slightly greater distance and the valve piston now moving more rapidly to the right has substantially opened the exhaust ports; at this stage the downward movement of the working piston begins to open the inlet ports 44, permitting air to be forced into the cylinder from the manifold 45 (Fig. 9) and scavenging the burnt gases out through the exhaust ports. In Fig. 13, the working piston has started back up on the compression stroke and the continuous movement of the valve piston 47 to the right has just closed the exhaust ports. A slight additional upward movement of the working piston will also suffice to close the inlet ports 44, after which the charge will be compressed in the upper end of the working cylinder. In Fig. 13 the valve piston 47 is approaching the extreme right end of its stroke. In Fig. 14 the working piston has moved up into uppermost position, the fuel pump 71 (Fig. 10) has injected the fuel into the cylinder, and the working stroke begins. At this time the valve piston 47 has started back toward the left but all the exhaust ports are still closed and will remain closed until the working piston again reaches the position shown in Fig. 11, at which time the exhaust ports will again begin to open by virtue, this time, of the leftward movement of the valve piston. It will be observed that during one cycle of the operation of the working piston, the valve piston 47, which travels at half engine speed, is moving toward the right, and during the next cycle of the working piston the valve piston moves toward the left, but the opening and closing of the exhaust ports always occur in the same timed relation in every cycle of operation of the main piston.

A substantial advantage of the construction shown in Figs. 9 and 10 is that the exhaust valve cylinder can be adequately cooled by waterjacketing and the exhaust piston maintained at a reasonably low working temperature, even though the engine be operated continuously at high speed. It is well recognized that the problem of cooling a 2-cycle engine is much more difficult than that of cooling a 4-cycle engine, because of the fact that the explosions occur twice as rapidly in a 2-cycle engine as in a 4-cycle engine, both operating at the same speed.

To simplify the disclosure, the engine of Figs. 1 and 3 has been disclosed of the carbureter type with spark plug ignition, whereas the engine of Figs. 9 and 10 has been shown as the Diesel type, with self ignition. It will be obvious, however, to those skilled in the art, that the construction shown in Figs. 1 and 3 can be adapted for Diesel operation and likewise the structure of Figs. 9 and 10 can be adapted for carbureter operation.

Figure 16:
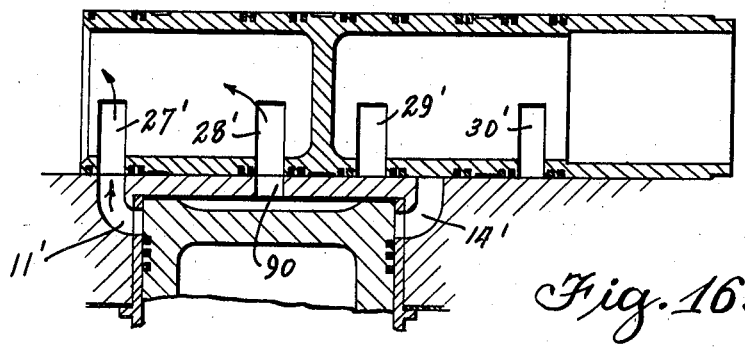

A modification of the valve construction of Fig. 1 is illustrated in Figs. 15 and 16. This construction differs essentially from that of Fig. 1 in that there are only three ports extending from the working cylinder and the valve cylinder, instead of four, and the two ports in the valve piston are so positioned as to register with the same cylinder ports in different positions of operation. Thus in Fig. 15 the end ports 11' and 14' and the end valve piston ports 27' and 30' are exactly the same as the corresponding ports 11, 14, 27 and 30 in Fig. 1. However, in Fig. 15 there are no ports corresponding to the ports 12 and 13 in Fig. 1. Instead, there is one central cylinder port 90 and the piston ports 28' and 29' are somewhat closer together than are the ports 28 and 29 in Fig. 1, so that these ports 28' and 29' can register with the cylinder port 90 in opposite end positions of the piston valve. Thus in Fig. 15 the piston valve is in extreme left position (corresponding to Fig. 5) and the inlet port 29' is in registration with the cylinder port 90. In Fig. 16 the piston valve is in extreme right position (corresponding to Fig. 8) and the piston port 28' is in registration with the cylinder port 90.

The construction shown in Figs. 15 and 16 has the advantage of providing the same valve capacity as the construction shown in Fig. 1, while at the same time reducing the volume of the ports in communication with the working cylinder during the compression stroke to thereby facilitate the obtainment of a high compression ratio.

Figure 17:
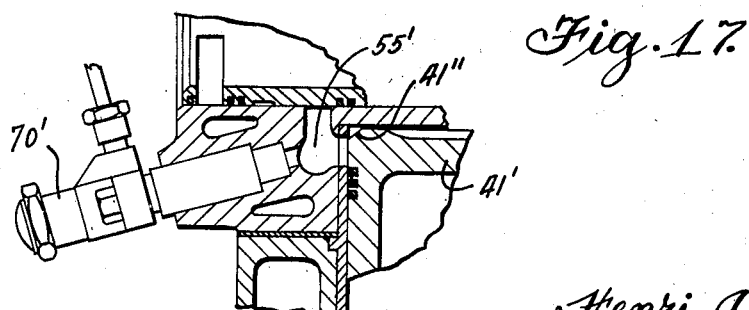
Fig. 17 is a detail section illustrating a modification of the structure shown in Fig. 9.

There is shown in Fig. 17 a variation of the construction shown in Fig. 9. In this construction the injector valve 70' discharges directly into the exhaust port 55' and the upper margin of the working piston 41' is chamfered at 41'' so that the piston never completely blocks the port 55'.

In contrast to this construction, the injector 70 in Figs. 9 and 10 discharges the fuel into the working cylinder through a port in the head of the working cylinder quite separate and distinct from the exhaust ports.

The advantage of this construction shown in Fig. 17, over that of Figs. 9 and 10, is that the port 55' being largely, although not completely, cut off from the working cylinder by the working piston 41 at the time of fuel injection, provides a very effective precombustion chamber in which the fuel ignites prior to the full development of the working pressure against the piston.

Many other modifications and variations in the particular construction shown will occur to those skilled in the art, and the invention is therefore to be limited only to the extent set forth in the appended claims.

I claim:

1. In an internal combustion engine, a working cylinder, a working piston reciprocable therein and connecting rod and crank means connected thereto, valve means for admitting and exhausting gases to and from said working cylinder, said valve means including a valve cylinder extending across the head of the working cylinder and projecting longitudinally beyond the peripheral plane of the working cylinder, ports communicating said working cylinder with said valve cylinder, some at least of said ports extending from the working cylinder through the peripheral wall thereof at a point so positioned longitudinally in the working cylinder as to be covered by the working piston near the end of the stroke of the latter, valve piston means reciprocable in said valve cylinder for opening and closing said ports, and means for reciprocating said valve piston means in timed relation with said working piston.

2. In an internal combustion engine, a working cylinder, a working piston reciprocable therein, and connecting rod and crank means connected thereto, valve means for exhausting gases from said working cylinder, said valve means including a valve cylinder extending across the head of the working cylinder, ports communicating said working cylinder with said valve cylinder, valve piston means reciprocable in said valve cylinder for opening and closing said ports, means for reciprocating said valve piston means in timed relation with said working piston, said ports controlled by said valve piston means constituting exhaust ports, said working cylinder having inlet ports in the peripheral wall thereof so positioned longitudinally in the cylinder as to be uncovered only at the end of the working stroke of the piston, and means for supplying intake gas under pressure to said last-mentioned ports.

3. In an internal combustion engine, a working cylinder, a working piston reciprocable therein, and connecting rod and crank means connected thereto, valve means for admitting and exhausting gases to and from said working cylinder, said valve means including a valve cylinder extending across the head of the working cylinder, ports communicating said working cylinder with said valve cylinder, valve piston means reciprocable in said valve cylinder for opening and closing said ports, and means for reciprocating said valve piston in timed relation with said working piston, said valve cylinder extending longitudinally beyond the peripheral plane of the working cylinder with some at least of said ports between the working cylinder and the valve cylinder extending from the working cylinder through the peripheral wall thereof.

4. In an internal combustion engine, a working cylinder, a working piston reciprocable therein, and connecting rod and crank means connected thereto, valve means for admitting and exhausting gases to and from said working cylinder, said valve means including a valve cylinder extending across the head of the working cylinder, ports communicating said working cylinder with said valve cylinder, valve piston means reciprocable in said valve cylinder for opening and closing said ports, and means for reciprocating said valve piston in timed relation with said working piston, in which said valve piston means comprises a hollow piston having a partition therein dividing it into two longitudinal separate compartments, one compartment being in permanent communication through one open end of the valve piston with one end of the valve cylinder, and the other compartment being in permanent communication through the opposite open end of the valve piston with the opposite end of the valve cylinder, inlet manifold means connected to one end of said valve cylinder, and exhaust manifold means connected to the other end, said valve piston and cylinder having separate cooperating ports for selectively communicating the working cylinder with different ones of said compartments in different positions of said valve piston, and at least one of said ports in said valve cylinder communicating with an exhaust port of said valve piston in one position of the latter, and with an inlet port of the valve piston in another position of the latter.

HENRI J. HICKEY.